Figure 1:
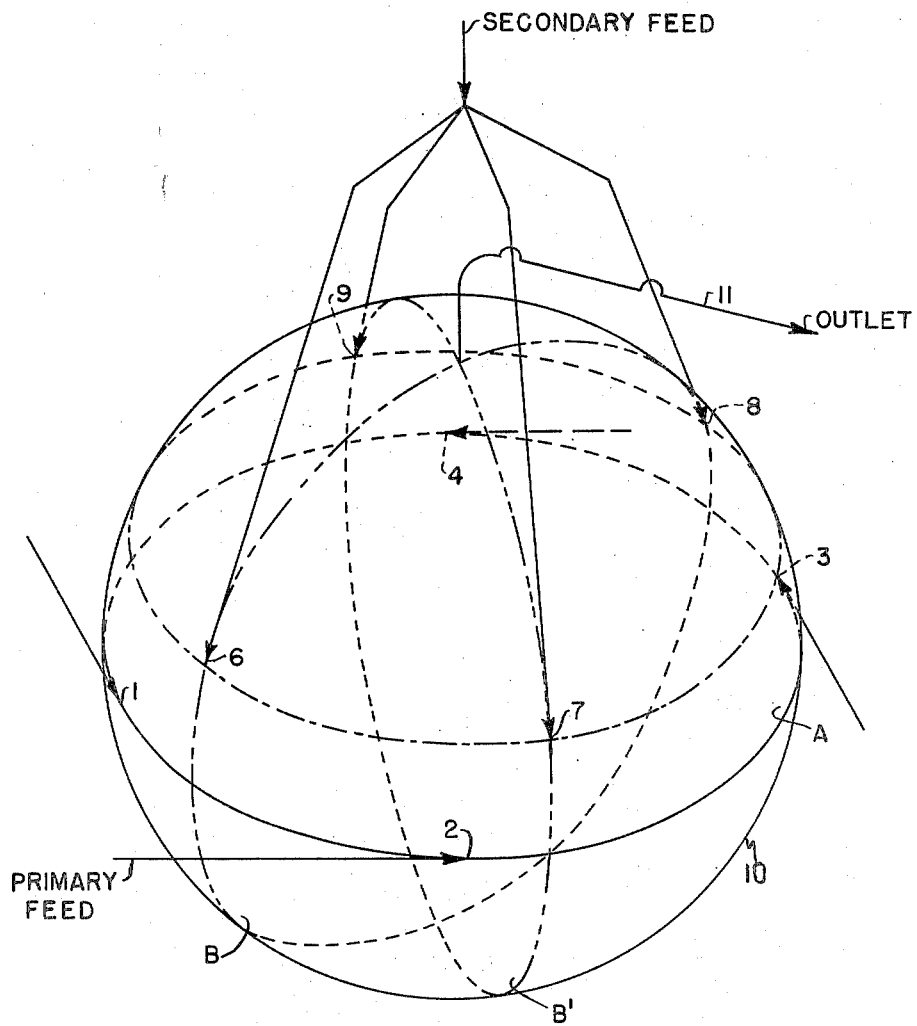

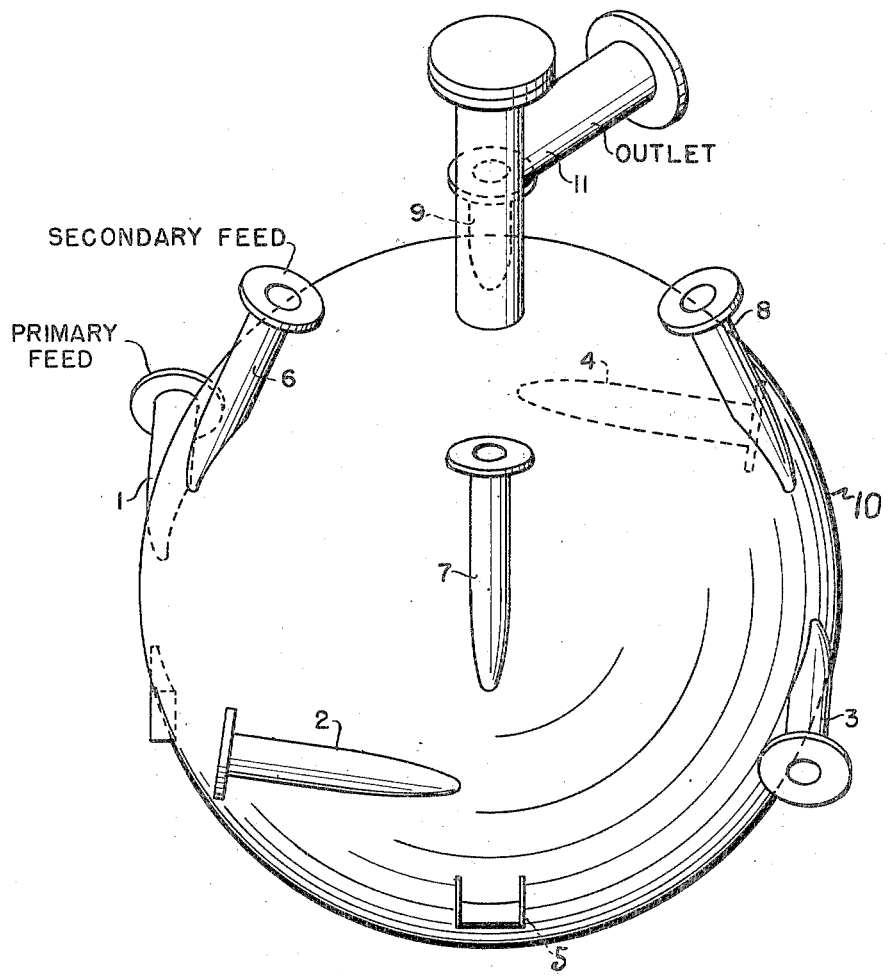
FIG. 2
INVENTORS:
CHRISTIAAN PIETER VAN DIJK
FRANCISCUS JOHANNES FREDERICUS VAN DER PLAS
THEIR AGENT

United States Patent Office 2,763,699
Patented Sept. 18, 1956

2,763,699

HOMOGENEOUS STEADY STATE CONVERSIONS IN TURBULENCE CHAMBERS AND APPARATUS THEREFOR

Christiaan Pieter van Dijk and Franciscus Johannes Fredericus van der Plas, Amsterdam, Netherlands, assignors to Shell Development Company, New York, N. Y., a corporation of Delaware Application October 18, 1954, Serial No. 462,766

Claims priority, application Netherlands October 29, 1953

20 Claims. (Cl. 260—654)

This invention relates to improvements in methods for effecting the interaction of two or more reactants in the vapor phase. The invention relates more particularly to improvements in carrying out vapor phase reactions between two or more reactants at least one of which is a normally gaseous hydrocarbon. A particular aspect of the invention relates to improved apparatus enabling the more efficient execution of vapor phase reactions.

Bringing about the interaction of charge components at conditions leading to the efficient production of a specific reaction product with a minimum of undesired byproducts is often rendered exceedingly difficult by inability to bring the reactants into contact with one another in a manner essential to the attainment of these results. Often the relative degree of efficiency attainable in the execution of a vapor phase reaction is dependent upon the extent to which instantaneous mixing of the reactants under conditions resulting in the immediate formation of a highly turbulent mixture in a reaction zone, the contents of which are maintained at a substantially constant state with respect to high degree of turbulence, volume, quantity and composition, can be achieved. The extent to which reaction conditions, including degree of turbulence, can be controlled is generally limited by the type of apparatus employed. Tubular reactors through which a flow of reactants is maintained render difficult, if at all possible, the maintenance of conditions of homogeneity with respect to turbulence and composition throughout the reaction zone. In types of reaction zones having essentially large cross-sectional areas, such as those provided by tanks, chambers, and the like, it is possible to maintain the contents thereof relatively constant with respect to quantity, composition and degree of turbulence. It is to improvements in operations employing apparatus presenting relatively large cross-sectional areas that the present invention is directed.

It has now been found that interaction in the vapor phase of at least two reactants is brought about under conditions enabling substantial improvements comprising more rapid attainment of intimate mixing of reactants and the maintenance of substantially constant conditions of uniformity with respect to turbulence and composition of reaction mixture throughout the reaction zone, by effecting the introduction of the reactants into reaction zones of enlarged cross-section area under well defined and critical conditions.

Apparatus providing reaction zones suitable for attaining the objects of the invention comprise those having a a zone of enlarged cross-sectional area wherein substantially all the wall surfaces are streamlined and the presence of dead spaces formed by angles, corners and the like are absent. In the suitable apparatus the longest axis of any cross-sectional area is at least four times the length of the shortest axis. Suitable types of apparatus comprise, for example, those having the form of a surface of revolution, such as, for example, a sphere, an ellipsoid, egg-shaped chambers, a cylinder with hemispherical ends, a torus, etc. A particularly preferred type of apparatus is that comprising a spherical reaction zone.

Essential to the attainment of the objects of the invention is the provision of two separate sets of inlets to the reaction zone enabling the separate injection of primary and secondary reactants under well defined, specific conditions.

Injection means for the primary reactant comprise a plurality of nozzles, enabling tangential injection of the primary reactant into the reaction zone under conditions forming a primary field of rotation of the reactor content; the primary field of rotation being capable of representation by a plane extending across the reaction zone and intersecting the walls of the reaction zone at the points of injection of the primary reactant. The reaction space is provided with an outlet for the reactor contents at a point removed from the plane of primary rotation. Introduction of the secondary reactant into the reaction zone is effected by means of a plurality of nozzles, each positioned in the reactor wall at a point lying between the plane of primary rotation and the outlet. The inlets to the reaction zone for the secondary reactant are positioned in a manner resulting in the ejection of the secondary reaction therefrom in the form of a stream substantially vertical to the plane of primary rotation formed by the primary reactant. In the preferred form of the invention the means employed for injecting the secondary reactant comprise a plurality of nozzles from which the secondary reactant is ejected in the form of a plurality of jets which enter the reaction zone tangentially and which intersect the plane defined by the primary field of rotation vertically, forming an angle of from 45° to 90°, and preferably from about 80°–90°, therewith.

In order that the invention may be more readily understood, reference is had to the attached drawing forming a part of the present specification, wherein Figure 1 shows, more or less diagrammatically, the flow of materials when employing a spherical reactor in accordance with the process of the invention and Figure 2 represents an elevational view of one form of a spherical type of apparatus in accordance with the invention.

Referring to Figure 1 a reactor, in the form of a sphere 10, is provided with a plurality of nozzles 1, 2, 3, and 4, respectively, enabling the tangential injection of a primary reactant into the reaction chamber. The nozzles 1, 2, 3, and 4 are positioned in a manner to result in the injection of each separate stream of primary reactant in substantially the same general plane and in the same direction of rotation. Injection of the primary charge through nozzles 1, 2, 3, and 4 results in the formation of a primary field of rotation of the reactor contents which may be represented by the plane A intersecting the reactor walls at the points of introduction of the nozzles 1, 2, 3, and 4. The invention is in no wise restricted to the use of a specific number of nozzles for injection of the primary reactants employed. In general, a number of nozzles ranging of, for example, from about one to about six, preferably about four, is suitable. In a preferred manner of carrying out the invention, primary nozzles are positioned in pairs to effect injection of primary reactant in the form of streams acting as couples upon the primary field of rotation A.

The reactor 10 is provided with an outlet 11 from which reactor contents are withdrawn during the course of the operation.

The reactor 10 is also provided with a plurality of nozzles, for example, nozzles 6, 7, 8 and 9, entering the reactor walls at points intermediate the outlet 11 and the plane of primary rotation A defined by the nozzles for the introduction of the primary reactant. Nozzles 6, 7, 8 and 9 are positioned in such wise that the stream introduced therethrough is directed vertically towards the field of primary rotation A. In a preferred modification of the invention the nozzles 6, 7, 8 and 9 provide for the tangential injection of the secondary reactant in such wise that the stream of secondary reactant intersects the primary field of rotation A at an angle of from about 45° to about 90°, and preferably from about 80° to about 90°. Thus, in the preferred embodiment of the invention, the secondary reactant entering the spherical reactor through nozzles 6 and 8 will be directed towards the field of primary rotation indicated by plane A within a plane illustrated substantially by the cross-sectional area B. Similarly the secondary reactant entering the spherical reactor through nozzles 9 and 7 will enter as a tangential stream flowing in the plane illustrated by the cross-sectional area B'. In the preferred embodiment of the invention the planes defined by the jets of secondary reactant, represented by the planes B and B', will form an angle of from about 45° to about 90°, and preferably for about 80° to about 90°, with the primary field of rotation represented by the cross-sectional area A.

Nozzles 6, 7, 8 and 9 need not necessarily be equally spaced from the primary field of rotation A. They are, however, positioned in such wise that the stream ejected therefrom does not travel through an arc greater than 90° before impinging upon the plane of primary rotation A. Placing of the nozzles in such wise as to result in direct opposition of their effluent streams is avoided. In the preferred embodiment of the invention nozzles 6, 7, 8 and 9 are positioned in such wise that a projection of the direction of the tangential effluence therefrom would pass through an arc of at least 270° before arriving at the outlet 11 of the reactor.

Figure 2 of the drawing represents more or less diagrammatically an elevational view of a spherical type of reactor suitable for carrying out the process of the invention on a practical scale. In Figure 2 parts of the apparatus which are identical with those of the apparatus represented diagrammatically in Figure 1 are identified by the same reference characters. The reactor is preferably positioned in suitable housing such as, for example, a furnace structure, wherein it is supported with the aid of means such as, for example, lugs. Means for entering the reactor, such as for example a manhole not shown in the drawing, may suitably be provided. The wall surface of such manhole is, however, shaped to maintain the stream-lined lines of the reactor wall. The spherical type of reactor renders relatively easy the maintenance of desired temperature conditions therein as a consequence of the substantial surface of the reactor in combination with the high state of turbulence of its contents. Maintenance of the desired temperature can be brought about by heat exchange through the reactor walls and/or by heating or cooling the charge introduced into the reactor.

In executing the vapor phase reaction in accordance with the invention the rate of introduction of reactants into the reaction zone and of withdrawal of reaction mixture therefrom, is controlled to maintain a substantially constant state of homogeneity with respect to quantity, composition and turbulence of reaction mixture therein.

The above-defined reactor enables the interaction of reactants in the vapor phase enabling substantially immediate mixing of the reactants and the obtaining and maintenance of a high degree of turbulence as well as a relatively constant degree of homogeneity of the reaction mixture throughout the reaction zone during the course of execution of the process. As a result contact of the reactants with one another at reaction temperatures prior to the adequate mixing is substantially completely avoided. Maintenance of optimum temperature contact time and ratio of reactants is greatly facilitated, thereby enabling execution of the reaction with substantial increase in yield and selectivity.

It is to be pointed out that though substantial modification of the position of the means of introduction of the secondary reactant is permissible within the scope of the invention, such variations in embodiment of the invention are in no wise equivalent nor conducive to the attainment of equivalet results. Though a part, or all, of the secondary reactant may be introduced into the reactor radially, such means of introduction is, however, in no wise the equivalent of the introduction of the secondary reactant tangentially and, at the angle of 45° to 90°, with respect to the primary field of rotation. Increasing turbulence, when using radial injection of secondary reactant, by increasing the rate of introduction of the secondary reactant through such nozzles has its limitations since there is a limit to the rate of flow attainable through any nozzle of specific design. The substantial increase in rate of feed introduction using radial injection not only entails the use of a substantially increased amount of energy but entails further difficulties in the maintenance of optimum conditions within the reaction zone. The above defined tangential injection, it has been found, not only enables the obtaining of a substantially increased degree of turbulence at a given rate of feed introduction, but results in the unexpected attainment of a surprising degree of improvement in efficiency of the operation, particularly as reflected by selectivity of the reaction. Thus, as evidenced by the following example, the reaction of a normally gaseous hydrocarbon with a halogen such as, for example, the reaction of normally gaseous hydrocarbons comprising propylene with chlorine, unavoidably results in the obtaining of substantial deposition of carbon when one of the reactants is injected radially into the reaction zone. On the other hand, injection of both reactants tangentially in the manner defined above enables the reaction to proceed in the substantially complete absence of carbon formation.

EXAMPLE I

Allyl chloride was produced by reacting propylene with chlorine in a mole ratio of 3:1 in a spherical glass reactor positioned in a housing structure. Propylene was introduced into the spherical reactor by tangential injection through four nozzles, each having a diameter of 0.5 mm., placed peripherically equidistant from one another in the wall of the spherical reactor. The propylene feed nozzles ejected the streams tangentially in the same circumferential direction and in substantially a common horizontal plane. The reactor outlet was positioned at a point in the wall of the reactor substantially equidistant from the propylene feed nozzles. Chlorine was introduced through a separate nozzle, having a diameter of 0.5 mm., enabling tangential injection of the chlorine in such wise that the stream of injected chlorine impinged on the plane defined by the four nozzles through which the propene was injected at an angle of about 80°. The reactor was maintained at a temperature of 510° C. and at a pressure of 1 atmosphere absolute. Chlorine was introduced into the reactor at 81 grams per hour, and propylene at the rate of 83 liters per hour (measured at 20° C.). The reaction proceeded smoothly over a prolonged period of time. Effluence was eliminated from the reactor at a controlled rate assuring maintenance of a constant quantity of reaction mixture in the reactor. Substantial absence of side reactions was shown by the complete absence of any substantial degree of carbon deposition upon the walls of reactor and outlet.

For the purpose of comparison, the operation was repeated under substantially identical conditions but with the exception that the propylene was introduced radially into the spherical glass reactor through a nozzle having a diameter of 1 mm. Operation with this means of chlorine injection results in the deposition of substantial amounts of carbon upon the reactor walls. Carbon deposition rendered the walls opaque after a period of time of operation and aggravated the problem of temperature control due to the greater difficulty of transferring heat through the reactor walls containing the carbon deposit.

The ability to control with inordinate degree of accuracy operating conditions in the method of operation in accordance with the invention enables its application with advantage to the execution of vapor phase reactions involving hydrocarbons wherein competitive reactions are encountered. The method and apparatus of the invention are applied broadly, for example, to the conversion of hydrocarbons in the presence of one or more added secondary gaseous, or vaporous, agents all or a part of which agents may function as reactant, catalyst, reaction modifier, or the like. Such processes include the conversion of hydrocarbons in the presence of halogen, oxygen, sulfur, halogen acids, hydrogen sulfide, materials yielding these materials under conditions of execution of the process, etc.; the interaction of different hydrocarbons, etc. Hydrocarbon reactions which may be carried out in accordance with the invention comprise, for example, dehydrogenation, cyclization, polymerization, aromatization, cracking, etc. Reactions involving hydrocarbons carried out in accordance with the invention include hydrocarbon halogenation, oxidation, sulfurization, hydration, etc.

The process and apparatus of the invention lend themselves with advantage to the substitutive halogenation of unsaturated hydrocarbons in the vapor phase. When halogens act on unsaturated hydrocarbons both substitution and addition may occur. In most instances both reactions take place simultaneously. As the temperature increases, however, the substitution reaction generally predominates.

According to the literature the reactions between unsaturated hydrocarbons and halogens are carried out in the gas phase in tubular reactors. The hydrocarbons, in admixture with halogen, are passed through tubular reaction zones wherein the reaction takes place. The tubular reactor, however, has the disadvantage that the temperature of the reaction mixture cannot be maintained uniform throughout the length of the reaction zone, and therefore will vary from the optimum in substantial portions of the elongated reaction zone. At the spot in the tubular reactor where the reaction is initiated a sudden sharp increase in temperature, and generally also in pressure, is often encountered. When the reaction is being carried out in a large scale installation, such variations in temperature cannot be satisfactorily controlled by expedients such as heat exchange. As a result optimum conditions for the substitution reaction, under which the ratio of yield of substitution products to that of addition products is high, can only be achieved in a relatively small part of the elongated reaction zone.

In accordance with the present invention, however, by use of the above-defined reaction system, the reaction between unsaturated hydrocarbons and halogen occurs in a reaction mixture which is kept practically homogeneous by means of high degree of turbulence, and to which mixture unsaturated hydrocarbons and halogen in vapor state are continuously supplied under such conditions that reaction, prior to intimate mixture with the reaction mixture, is substantially precluded; and reaction mixture is continuously withdrawn at a controlled rate assuring maintenance of a steady state within the reaction zone. Mixing of the charge components with the reaction mixture is effected very quickly. The degree of homogeneity and the uniformity of temperature throughout the entire reaction space are very important, since only by this means is it possible for the entire reaction to proceed under the most favorable conditions for promoting the substitution reaction and for suppressing the addition reaction. The degree to which the reactions in the reaction mixture go to completion, and consequently also composition of the reaction mixture, is dependent not only upon temperature and pressure but also upon the period of time during which the mixture remains in the reactor. Temperature conditions assuring the attainment of the desired halogen substitution reactions, such as the chlor-substitution of a normally gaseous hydrocarbon, such as propylene, comprise, for example, a temperature in the range of from about 200 to about 800° C., and preferably from about 350 to about 675° C. The halogen content of the reactor is preferably maintained relatively low, for example, below about 1%.

Unconverted hydrocarbons remaining in the reactor effluence are separated therefrom and recycled to the reaction zone.

Illustrative of substitutive halogenation in accordance with the invention is the following example directed to the substitutive chlorination of propylene with the formation of allyl chloride as the predominant product.

EXAMPLE II

Propylene was reacted with chlorine, in a mol ratio of propylene to chlorine of 3:1, in a spherical reactor at a temperature of 510° C. and a pressure of 1 atm. abs. Chlorine was injected tangentially into the reactor in a manner defining a primary field of rotation in the reactor. Propylene was injected into the reactor radially in the form of a jet entering the reactor perpendicularly to the plane of rotation defined by injection of the chlorine. Effluence was taken from the reactor at a point at least 270° away in the direction of flow of any entering jet. The effluent stream left the reactor at a controlled rate substantially equal to the rate of total feed introduction. Chlorine was introduced into the reactor at the rate of 81 grams per hour and propylene at the rate of 83 liters per hour (measured at 20° C.). For the purpose of comparison the same reaction was carried out in a tubular reactor under substantially identical conditions of temperature, pressure, residence time, and ratio of propylene to chlorine. Results obtained in each of the two operations in terms of yield of allyl chloride and dichloropropane are set forth in the folowing table 1:

Table 1

| Product | Yield | |
|---|---|---|
| | Spherical Reactor | Tubular Reactor |
| Allyl chloride | 79.0 | 76.3 |
| Dichloropropane | 0.2 | 6.1 |

Examples of specific hydrocarbons which are similarly subjected to the chloro-substitution reaction in accordance with the invention comprise, for example, ethylene, butylene, pentenes, hexenes, octenes, cyclohexene, acetylene, etc.

Hydrocarbon conversion in the presence of an added gaseous component, in accordance with the invention, is further illustrated by the conversion of hydrocarbons comprising a normally gaseous hydrocarbon, such as, for example, propylene, in the presence of oxygen. When employing the method and apparatus of the present invention, substantial amounts of the normally gaseous hydrocarbons are converted in the presence of the added oxygen to reaction products comprising normally gaseous unsaturated hydrocarbons of low molecular weight. The specific nature of the reaction mixtures obtained are dependent to some degree upon the specific temperature employed. When converting hydrocarbons comprising propane in the presence of added oxygen, under the above defined conditions wherein the charged components are separately injected into a reactor of the type of the present invention, products of dehydrogenation and cracking are obtained in predominant amounts when maintaining the reactor at a temperature in the range of from about 400° to about 900° C., preferably from about 450° to about 600° C. Oxygen is introduced into the reaction zone as such, or in the form of an oxygen-containing gas such as, for example, air. The oxygen or oxygen-containing gas is introduced into the reaction zone at a carefully controlled rate to maintain the oxygen content within the reactor below about 1%. Normally gaseous materials, or materials which are gaseous and do not undergo substantial conversion under the condition of execution of the reaction such as, for example, nitrogen, steam or the like, may be injected separately, or with the secondary gaseous agent, as diluent or heat controlling agent into the reaction zone through through the secondary feed nozzles.

The formation of undesirable by-products by reactions taking place initially prior to the attainment of the reaction conditions in the turbulent state are readily avoided when using the method and apparatus of the present invention. In a preferred method of operation the reactants are separately heated to a temperature not exceeding about 400° C. prior to their injection into the reaction zone under the above-defined conditions resulting in substantially immediate formation of a reaction mixture in a highly turbulent state.

The following example is illustrative of the conversion of a saturated hydrocarbon in the presence of added oxygen in accordance with the invention.

EXAMPLE III

Propane was subjected to conversion in the presence of oxygen by injecting propane and air into a spherical reactor in a mole ratio of air to propane of 1:2. Propane was injected into the reactor at the rate of 55.5 liters per hour under conditions resulting in the formation of a plane of primary rotation of the reactor contents. Air was separately injected into the reactor at the rate of 27.5 liters per hour (measured at 20° C.) in the form of a jet substantially vertical to the field of primary rotation produced by the injected propane. The reactor was maintained at a temperature of 500° C. Introduction of charge into the reactor, and a removal of reaction mixture therefrom, were controlled to maintain reactor contents at a steady state. The operation was continued for three hours. Analysis of the accumulated reactor effluence indicated the composition thereof to be as follows:

*Table II*

| Component: | Percent by volume |
|---|---|
| $H_2$ | 0.7 |
| $O_2$ | 0.6 |
| $CO$ | 1.4 |
| $CO_2$ | 0.3 |
| $CH_4$ | 5.5 |
| $C_2H_6$ | 0.5 |
| $C_2H_4$ | 5.1 |
| $C_3H_8$ | 53.1 |
| $C_3H_6$ | 5.0 |
| $C_4H_{10}$ | 0.7 |
| $C_4H_8$ | 0.3 |
| $C_5H_{12}$ | 0.1 |
| $N_2$ | 26.5 |
| Aromatic hydrocarbons | 0.2 |

It is seen from the foregoing data that a substantial amount of the propane charge was converted to materials comprising ethane and ethylene and that in addition thereto a substantial amount of the propane was dehydrogenated to propylene.

EXAMPLE IV

Propane was converted in the presence of air in a spherical reactor substantially under the conditions described in the foregoing Example III with the exception that the reactor was maintained at 550° C. and the air and propane were introduced in a molar ratio of air to propane of 1:1.7. The rates at which propane and air were introduced were 21 liters/hour and 12.5 liters/hour, respectively (measured at 20° C.). Analysis of the accumulated reactor effluence indicated the following composition:

*Table III*

| Component: | Percent by volume |
|---|---|
| $H_2$ | 2.0 |
| $O_2$ | 0.1 |
| $CO$ | 1.4 |
| $CO_2$ | 0.6 |
| $CH_4$ | 8.2 |
| $C_2H_6$ | 1.1 |
| $C_2H_4$ | 6.8 |
| $C_3H_8$ | 47.8 |
| $C_3H_6$ | 5.3 |
| $C_4H_{10}$, $C_4H_8$ | 0.5 |
| $C_5H_{12}$ | 0.1 |
| $N_2$ | 26.0 |
| Aromatics | 0.2 |

Substantial advantage is often derived by effecting a reaction in stages employing a plurality of the apparatuses of the invention in series. This is particularly the case when the reaction product, primarily desired, readily undergoes further conversion to less desirable by-products.

The degree to which such undesired subsequent reactions are encountered not only depends on the temperature and pressure employed, but also on the concentration of the desired main reaction product in the total reaction mixture. The smaller this concentration is, the less marked are the undesired subsequent side-reactions. However, in carrying out the reaction under stationary-homogeneous conditions this concentration (expressed as a percentage of the total mixture) is equal to the yield and is preferably kept high as a matter of economy. Thus, there are two requirements—high yield and suppression of subsequent reactions—which are at times difficult to satisfy simultaneously when carrying out the process according to the method described under stationary-homogenous conditions.

The use of a plurality of the reactors of the present invention in series now provides a method by which vapor phase reactions, in which side reactions often play a considerable part, and in which one of the starting reactants can combine with the desired reaction product to produce a subsequent reaction, the combined desiderata of high yield and suppression of side and subsequent reactions, can be attained to a least a substantial degree.

Accordingly the reaction is carried out in a plurality of successive reactors arranged in series flow into each of which the reactants are continuously injected as defined above, and from which the reaction mixture is continuously discharged, so that the total quantity of reaction mixture gas which, in a particular reaction zone forms the reaction mixture, remains relatively constant. In each reactor the reaction mixture is kept practically homogeneous by means of turbulence as described above. Only a part of the quantity of the initial material to be reacted, which can lead to the undesired subsequent reaction, is supplied to the first of the plurality of reactors, while the remainder of this initial material is introduced into one or more of the other reactors. Thus, when reacting a hydrocarbon in the presence of a secondary feed component, such as halogen, oxygen, sulfur, etc., all of the hydrocarbon charge is introduced into the first of a plurality of reactors arranged in series flow whereas the secondary feed component is introduced in part into each of a plurality of the reactors.

The connecting lines between the reactors should be relatively short so that conversion in these lines is negligible. Furthermore, it is desirable that any further reaction in the mixture leaving the last reactor be suppressed, for instance, by cooling or rapid separating of the components.

Maintenance of the desired temperatures may be ensured, if necessary, by heat exchange through the walls of the reaction chambers and/or by heating or cooling the gases to be supplied to a reaction chamber. If desired, the gas stream passing from one reactor to the next in the series may be heated or cooled in the connecting line.

The product is separated from the reaction mixture leaving the last reactor of the series. Remaining non-converted initial materials may be recycled to one or more of the reactors.

The substantial advantages inherent in the use of the plurality of above-described reactors of the invention in series is exemplified in its application to substitutive halogenation of hydrocarbons such as, for example, the production of allyl chloride by substitutive chlorination of propylene. The substantial increase in yield of the desired product of the chlor-substitution reaction made possible by the use of the plurality of reactors in series as described above is evidenced by the following examples:

EXAMPLE V

In an operation identified by the designation "Run A," allyl chloride was produced by reacting propylene with chlorine in a mol ratio of propylene to chlorine of 3:1 in a reactor system consisting of three spherical reactors, each having a diameter of 6 cm., arranged in series flow. Each reactor was provided with a primary feed nozzle having a diameter of 1.0 mm., an outlet removed about 90° from the primary feed nozzle, and a secondary feed nozzle having a diameter of 0.5 mm. positioned in the wall of the spherical reactor between the primary feed nozzle and the outlet. The secondary feed nozzle was positioned in such wise that the jet therefrom entered the reactor substantially at right angles, and vertical, to the jet from the primary feed nozzle, and substantially vertical to the plane of rotation created by the jet from the primary feed nozzle. Effluence from the first and the second reactors of the series was passed to the primary feed nozzles in the second and third reactors, respectively, of the series, by means of transfer lines 1.0 mm. in diameter. Propylene was injected into the first of the reactors in the series through the primary feed nozzle at the rate of 67.5 liters per hour (measured at 20° C.). Chlorine was injected into each of the reactors of the series through the secondary feed nozzles at the rate of 23 grams per hour (measured at 20° C.). The reactors were maintained at 510° C. and at a pressure of 1 atmosphere absolute, withdrawal of effluence from the last reactor in the series was controlled to maintain a constant quantity of reaction mixture in the reaction system.

In a separate operation, "Run B," propylene was reacted with chlorine in a molar ratio of propylene to chlorine of 3:1 at a temperature of 510° C. and a pressure of 1 atmosphere absolute, in a reactor system consisting of only one of the spherical reactors employed in the foregoing operation "Run A."

For the purpose of comparison, in a third operation identified by the designation "Run C," propylene was reacted with chlorine in a molar ratio of propylene to chlorine of 3:1, at a pressure of 1 atmosphere absolute, in a tubular reactor maintained at 510° C. The reaction products obtained in each of the three runs were analyzed and the results obtained in terms of yield of allyl chloride, dichloropropylene, and dichloropropane are set forth in the following table for each of the three separate operations:

Table IV

| | Yield, percent | | |
|---|---|---|---|
| | Run A | Run B | Run C |
| Allyl chloride | 85.9 | 79.0 | 76.3 |
| Dichloro propene | 11.0 | 16.4 | 10.2 |
| Dichloro propane | 0.2 | 0.2 | 6.1 |
| Other compounds | 3.1 | 4.4 | 7.4 |

EXAMPLE VI

The Run A of the foregoing Example V wherein allyl chloride was produced by substitutive chlorination of propylene with chlorine in a reactor system consisting of three spherical reactors in series was repeated under substantially identical conditions using the same reactor system with the exception that the propylene was introduced into the first reactor of the series at the rate of 67 liters/hour (measured at 20° C.) and chlorine was introduced into each of the reactors at the rate of 20 grams/hour. The molar ratio of propylene to total quantity of chlorine charged was therefore 3:5. The reactor temperature was maintained at 490° C. Analysis of the reaction products indicated the following results in terms of yield of allyl chloride, dichloropropene and dichloropropane:

| | Percent |
|---|---|
| Allyl chloride | 86.4 |
| Dichloro propene | 9.6 |
| Dichloro propane | 0.3 |
| Other chlorine compounds | 3.7 |

We claim as our invention:

1. Apparatus for bringing into contact with one another two or more components in a high state of turbulence, comprising a chamber, the walls of said chamber being curved and adapted to streamline flow, a first inlet positioned in the wall of said chamber, an outlet positioned in the wall of said chamber at a point removed from said first inlet, a second inlet positioned in the wall of said chamber between said first inlet and said outlet, means for injecting components in the vapor phase at high velocity through said first and second inlets, said first inlet being disposed with respect to the interior of said chamber to cause the stream of components passed therethrough to enter said chamber tangentially establishing and maintaining a field of rotation in the contents of said chamber, said second inlet being disposed with respect to the interior of said chamber to cause the stream of components passed therethrough to enter said chamber in a direction substantially normal to said field of rotation established by said stream of components entering into said chamber through said first inlet.

2. Apparatus in accordance with claim 1 wherein said second inlet is disposed with respect to the interior of said chamber to cause the stream of components passed therethrough to enter said chamber in a direction making an angle of from about 45° to about 90° with said field of rotation established by said stream of components entering into said chamber through said first inlet.

3. Apparatus in accordance with claim 2 wherein said chamber is essentially spherical.

4. Apparatus for bringing into contact with one another two or more reactants in a high state of turbulence, comprising a chamber, the walls of said chamber being curved outwardly and adapted to streamline flow, a first means for injecting a reactant tangentially into said chamber at high velocity establishing and maintaining rotation of contents of said chamber about an axis of rotation which is normal to a plane of primary rotation intersecting the wall of said chamber at the location of said first means for injecting reactant, an outlet positioned in the wall of said chamber at a point remote from said first means for injecting a component, a second means for injecting a reactant into said chamber at a high velocity, said second means being so disposed with respect to the interior of said chamber that reactants injected therethrough enter said chamber in a direction which is substantially normal to said primary plane of rotation of chamber contents.

5. Apparatus for bringing into contact with one another two or more reactants in a high state of turbulence, comprising a spherical reaction chamber, a plurality of primary inlet conduits positioned circumferentially in the wall of said chamber, an outlet positioned in the wall of said chamber at a point removed from said primary inlet conduits, a secondary inlet conduit positioned in the wall of said chamber between said circumferentially positioned primary inlet conduits and said outlet, means for injecting reactants in the vapor state through said primary and secondary inlet conduits at a high velocity, said primary inlet conduits being so disposed with respect to the interior of said chamber as to establish and maintain rotation of contents of said chamber about an axis normal to a plane of rotation defined by said circumferentially positioned primary inlet conduits, said secondary inlet conduit being so disposed with respect to the interior of said chamber as to cause reactants to be injected therethrough into said chamber in a direction which makes an angle in the range of from about 45° to about 90° with said plane of rotation defined by said circumferentially placed primary inlet conduits.

6. Apparatus for bringing into contact with one another two or more reactants in a high state of turbulence, comprising a spherical reaction chamber, a plurality of primary inlet conduits positioned circumferentially in the wall of said chamber, an outlet positioned in the wall of said chamber at a point removed from said primary inlet conduits, a plurality of secondary inlet conduits positioned in the wall of said chamber between said circumferentially positioned primary conduits and said outlet, means for injecting reactants in the vapor state through said conduits at high velocity, said primary inlet conduits being so disposed with respect to the interior of said chamber as to establish and maintain rotation of contents of said chamber, and said secondary inlet conduits being so disposed with respect to the interior of said chamber as to cause reactants to be injected therethrough into said chamber in a direction which is substantially normal to a plane intersecting the walls of said chamber at the points of location of said circumferentially positioned primary inlet conduits.

7. Apparatus in accordance with claim 6 wherein said secondary inlet conduits are so disposed with respect to the interior of said chamber as to cause reactants to be injected therethrough into said chamber in a direction making an angle of from about 45° to about 90° with a plane intersecting the wall of said chamber at the points of location of said circumferentially positioned inlet conduits.

8. Apparatus in accordance with claim 6 wherein said secondary inlet conduits are so disposed with respect to the interior of said chamber as to cause reactants to be injected therethrough into said chamber in a direction making an angle of from about 80° to about 90° with a plane intersecting the wall of said chamber at the points of location of said circumferentially positioned inlet conduits.

9. In a hydrocarbon conversion process wherein hydrocarbons are converted in the vapor phase and in the presence of an added component in a reaction chamber adapted for streamlined flow and maintained at hydrocarbon conversion conditions of temperature and pressure in the temperature range of from about 200 to about 900° C., the steps which comprise injecting said hydrocarbons in the vapor state and at a high velocity tangentially into said chamber through a primary inlet in the wall of said chamber, thereby establishing and maintaining a field of rotation in the contents of said chamber, injecting said added component at high velocity into said chamber from a point between said primary inlet and said outlet and in a direction which is substantially normal to said field of rotation established by injection of said hydrocarbons, withdrawing contents from said chamber through an outlet in said chamber remote from said primary inlet, and controlling the rate of withdrawal of contents from said chamber to maintain the total quantity of materials in said chamber at a substantially constant value.

10. The process in accordance with claim 9 wherein said added component is a member of the group consisting of halogen, sulfur and oxygen.

11. The process in accordance with claim 10 wherein said added component is halogen.

12. The process in accordance with claim 10 wherein said added component is oxygen.

13. In a hydrocarbon conversion process wherein hydrocarbons are converted in the vapor phase and in the presence of an added component selected from the group consisting of oxygen, halogens and sulfur in a spherical reaction chamber maintained under hydrocarbon conversion conditions of temperature and pressure in the temperature range of from about 200 to about 900° C., the steps which comprise injecting said hydrocarbons in the vapor state and at a high velocity into said chamber through a plurality of conduits circumferentially positioned in said chamber to establish and maintain rotation of the contents of said chamber about an axis which is normal to a plane of rotation defined by said circumferentially positioned primary conduits, injecting said added component at a high velocity into said chamber from a point between said circumferentially positioned conduits and said outlet and in a direction forming an angle of from about 45° to about 90° with said plane of rotation defined by said circumferentially positioned conduits, withdrawing contents from said chamber through an outlet in said chamber remote from said circumferentially positioned conduits, and controlling the rate of withdrawal of contents from said chamber through said outlet to maintain the total content of said chamber substantially at a constant value.

14. The process in accordance with claim 13 wherein said added component is halogen.

15. The process in accordance with claim 13 wherein said added component is oxygen.

16. The process in accordance with claim 13 wherein said hydrocarbons are normally gaseous hydrocarbons.

17. In the substitutive halogenation of hydrocarbons wherein hydrocarbons are reacted with a halogen at a temperature in the range of from about 400° to about 900° C., the steps which comprise injecting said hydrocarbons in the vapor phase and at high velocity into a spherical reaction chamber through a plurality of primary inlets circumferentially positioned in the wall of said chamber to establish and maintain rotation of the contents of said chamber about an axis which is normal to a plane of rotation defined by a plane traversing said spherical chamber and intersecting the walls thereof substantially at the positions of said circumferentially positioned primary inlets, injecting said halogen at a high velocity into said chamber from a point intermediate said circumferentially positioned primary inlets and said outlet and in a direction forming an angle in the range of from about 45° to about 90° with said plane of rotation established by said injection of hydrocarbons, withdrawing contents from said chamber through an outlet in said chamber remote from said circumferentially positioned primary inlet, and controlling the rate of withdrawal of contents from said chamber through said outlet to maintain the total content of said chamber at a constant value throughout said halogenation.

18. The process in accordance with claim 17 wherein said hydrocarbons are unsaturated normally gaseous hydrocarbons.

19. The process in accordance with claim 18 wherein said halogen is chlorine.

20. The process in accordance with claim 19 wherein said hydrocarbons are propylene.

References Cited in the file of this patent

UNITED STATES PATENTS

| | | |
|---|---|---|
| 1,447,259 | McDonald | Mar. 6, 1923 |
| 2,217,649 | Goddard | Oct. 8, 1940 |
| 2,259,195 | Baehr et al. | Oct. 14, 1941 |
| 2,299,849 | Rees | Oct. 27, 1942 |
| 2,395,406 | Goddard | Feb. 26, 1946 |
| 2,396,567 | Goddard | Mar. 12, 1946 |
| 2,482,284 | Michael et al. | Sept. 20, 1949 |
| 2,582,938 | Eastman et al. | Jan. 15, 1952 |

FOREIGN PATENTS

| | | |
|---|---|---|
| 513,947 | Great Britain | Oct. 26, 1939 |